Patented Jan. 19, 1926.

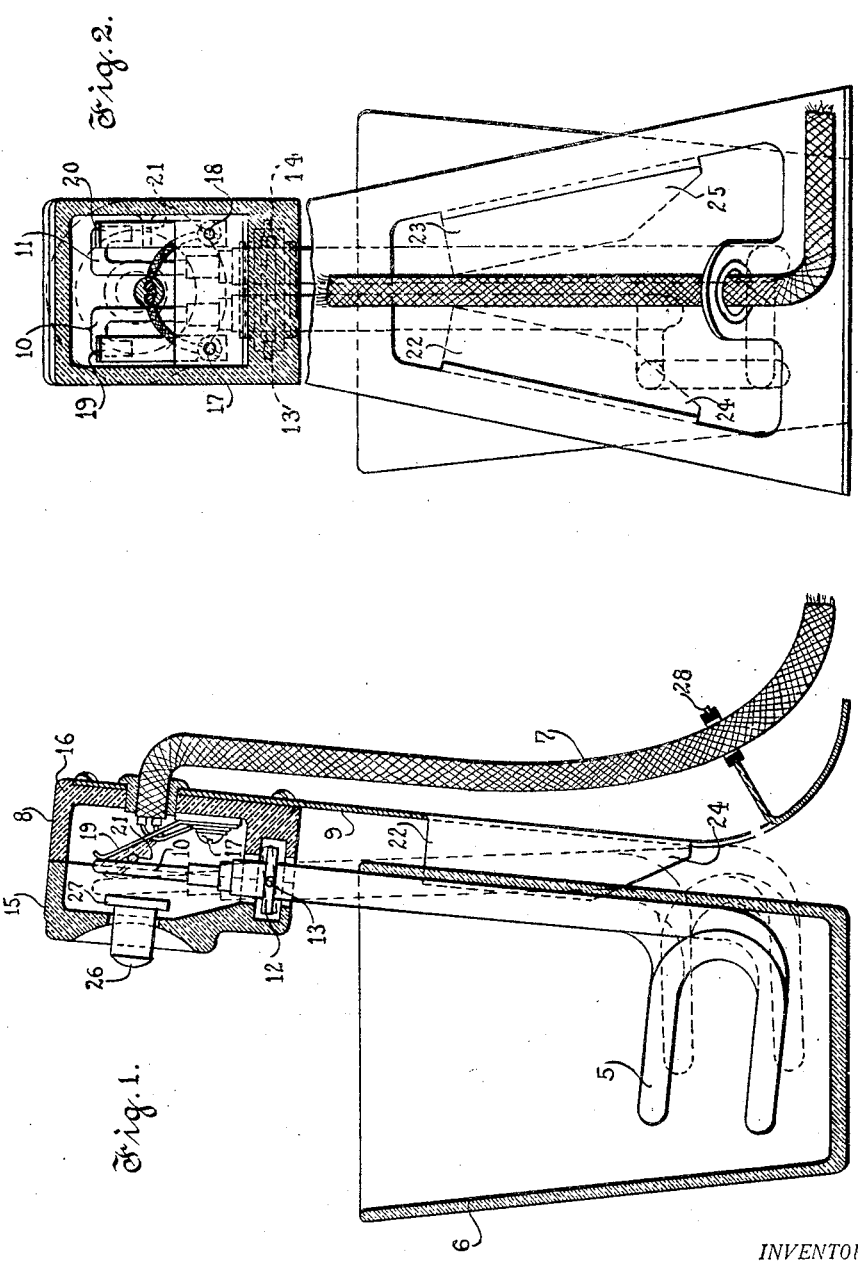

1,570,507

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

ELECTRIC APPLIANCE.

Application filed September 21, 1921. Serial No. 502,293.

*To all whom it may concern:*

Be it known that I, EDWIN N. LIGHTFOOT, a citizen of the United States, residing at New York, in the county of Bronx and State of New York, have invented new and useful Improvements in Electric Appliances, of which the following is a full, clear, concise, and exact description, reference being had to the accompanying drawing, forming a part of this specification.

This invention relates to electric appliances and more particularly to such appliances employing a heater which may be of the so-called immersion type.

In such appliances as ordinarily constructed the heater itself is wholly or substantially unguarded. In fact, for effective and efficient service such condition of the heater is practically essential, whereby in the absence of special provision there results great danger of injury to the person of the operative as well as to adjacent inanimate objects due to the strong likelihood of the heater being permitted to remain energized when not in actual service and the present invention has among its objects that of practically preventing such misuse and minimizing the attendant dangers.

Another object is that of providing an appliance of the character stated wherein provision is made for connecting the heater in circuit automatically upon positioning of the same in operative relation with respect to its associated parts and for effecting de-energization of the heater upon removal thereof from such operative relation.

Another object is that of increasing the stability of such appliances when in operative relation.

Other objects and advantages will hereinafter appear.

In the accompanying drawing, wherein is illustrated an embodiment of the invention;

Figure 1 is a side elevational view thereof, certain parts being shown in vertical section; while, Fig. 2 is a rear elevational view, also partly in section, of the same.

Referring to the drawing the same illustrates an appliance including a heater 5 of the immersion type, designed and adapted for heating relatively reduced quantities of liquid such as that contained within the drinking glass 6 illustrated, together with a suitable current conduit 7 and an automatic switching device indicated generally at 8 whereby upon insertion of the heater within the glass 6 or other container the heater is automatically connected in circuit with the current conductors, whereas, upon removal of the heater from the receptacle the heater circuit is automatically interrupted. The device further includes a stand indicated generally at 9 which is adapted to co-operate with the aforedescribed elements in ways and for purposes to be described.

The heater 5 may be of practically any desired or preferred construction but for present purposes the same may comprise preferably a reflexed tube composed of waterproof material containing the heating element and provided with adjacently arranged terminals 10 and 11.

A plate or collar 12 is secured permanently about the heater at a point adjacent the terminals thereof, said collar being provided at the opposite terminal portions thereof with trunnions 13 and 14 located preferably in co-axial relation to one another in the common plane of the reflexed portions of the heater.

The switching device 8 preferably includes an outer casing comprising complementally grooved and recessed interfitting sections 15 and 16 composed of insulating material adapted to surround and enclose the heater terminals and also the upper portion of the heater itself to a region somewhat below the position of the collar 12, the recess and the passage connecting the same with the exterior of the casing being of such size as to permit a given degree of rocking movement of the heater with reference to the casing. Said passage is enlarged substantially as illustrated to provide a further recess for the collar 12 and is further provided with suitably disposed openings to provide bearings for the trunnions 13 and 14. Said casing sections in practice are preferably composed of a suitable and durable insulating material such as porcelain or one of the well known molded insulation products.

The conduit 7 is preferably led through a suitable opening in the casing section 16, said section being provided internally with suitable fixed terminals 17 and 18 for attachment of the conduit leads, ordinarily two in number, whereas, a corresponding number of resilient contacts 19 and 20 are secured to said casing section in electrically conductive relation to the respective conduit leads but in insulated relation to one another, being in practice preferably secured to the interior of the casing by means of the terminal screws 17 and 18. Said contacts are bent inwardly or forwardly of the switch casing and are shaped and adapted to engage the upper portions of the respective heater terminals for effecting circuit through the heater, the resiliency of said contacts serving to promote positiveness of such electrical engagement and also serving to bias the heater as a whole to rotate upon its trunnions in a counter-clockwise direction with reference to the switch casing.

In practice a stop 21 which may comprise a stud fixed within the switch casing is arranged in the path of one of said contacts, as for example contact 20, for limiting movement thereof toward its associated heater terminal whereby upon swinging of the heater under stored energy of the other of said resilient contacts beyond the position of said stop circuit to the heater is interrupted between such contact 20 and its associated heater terminal 11 with the obvious result that the resilient contacts themselves serve in conjunction with the associated elements aforedescribed to bias the heater to de-energized position.

The aforementioned stand 9 may preferably comprise a sheet metal stamping or the like screwed or otherwise permanently secured to the switch casing as illustrated, the lower end of said stand being preferably bent backwardly and also being preferably laterally extended somewhat as illustrated. The length or height of such stand is preferably so selected as to provide for maintaining the heater substantially in the position illustrated in full lines in Fig. 1 so long as said heater is applied to the liquid container.

Further, said stand is preferably provided with forwardly projecting wings 22, 23 which may be inbent from the material of the stand itself, such wings or the like being shaped to engage the contiguous portion of the container for releasably clamping the appliance thereto and also for insuring relative positioning of the heater and the stand substantially in the relation illustrated in full lines in Fig. 1 so long as the appliance is so clamped. On the other hand said wings are spaced laterally from one another a distance sufficient to permit swinging of the heater therebetween under the biasing action of the contact 19 upon removal of the appliance from the container, in which relation the circuit to the heater is interrupted in the manner aforedescribed.

In order to facilitate operative positioning of the appliance with reference to the container, the lower portions of the wing members 22 and 23 are preferably tapered or beveled as illustrated particularly at 24 and 25 whereby upon pressing the appliance down upon the rim of the container said tapered surfaces are adapted to slide past said rim without material resistance, the lower portion of the heater being oppositely deflected as shown.

As a further aid in adjusting the appliance to the container, a push button 26 may be arranged within a suitable opening in switch casing section 15, said push button having an enlarged portion 27 located interiorly of the casing and adapted to engage the terminals of the heater and being provided with a suitable shoulder for maintaining the plug in assembled relation. Obviously upon pressing in said button the heater is caused to swing in a clockwise direction with reference to the switch casing and against the bias of the contacts 19 and 20 thereby causing the lower portion of the heater to swing away from the adjacent portions of the stand whereby obviously the appliance may be readily slipped over the edge of the container. Said stand is further provided adjacent its lower terminal portion with a conduit guide 28 which may also comprise a lug or tongue of metal stamped outwardly and backwardly from the material of the stand proper.

By the foregoing construction and arrangement it is apparent that by the simple action of placing the appliance in operative relation with the heater within the container, circuit through the heater is automatically established assuming energization of the conduit 7, whereas, upon removal of the appliance from the container the circuit through the heater is automatically and positively broken. Also the aforedescribed construction of the stand or bracket is adapted to lend a relatively high degree of stability to the appliance when in operative relation to its associated container whereby in fact the stability of the whole is materially increased over that of many forms of container alone, while the special conduit guide additionally provides against overturning of the container through accidental or unwarranted pull upon the conduit.

What I claim as new and desire to secure by Letters Patent is:

1. The combination with an electric heater and a switch to control the circuit thereof, of a switch operating element so associated with said heater as to necessitate switch operating action of said element upon forcible positioning of the heater in operative relation to a body to be heated, said element having parts adapted to lend physical stability to the heater and to such body when applied to the latter.

2. The combination with an electric heater and a switch to control the circuit thereof, of a switch operating element so associated with said heater as to necessitate switch operating action of said element upon forcible positioning of the heater in operative relation to a body to be heated, said element having parts adapted to lend physical stability to the heater when so positioned.

3. In combination, a switch casing, a switch operating element rigidly connected to said casing and a heater pivotally carried by said casing in a relation providing for relative movement of said element and said heater such as to effect operation of the switch upon wedging movement of said element and heater with respect to a container wall.

4. In combination, a switch casing, a switch operating element rigidly secured thereto, a heater pivotally carried by said casing and having a terminal movable relatively to said casing, a resilient contact fixed to said casing and tending to engage with said terminal, and means biasing said terminal out of engagement with said contact.

5. In combination, a switch casing, a switch operating element fixed thereto, a heater carried by said casing and having a terminal movable relatively to said casing, a resilient contact fixed to said casing and tending to engage with said terminal, and another resilient contact for holding said terminal out of engagement with said first mentioned contact pending given relative movement of said heater and said operating element.

6. An electric heating appliance, comprising a heating element, a support against which said element is biased to automatically break the circuit connections for said element, and means providing for automatically making and maintaining said circuit connections upon separation of said element and support by an object wedged therebetween.

7. An electric heating appliance, comprising a heating element, a stand to which said element is pivotally connected, a switch for said element also supported by said stand, an electric conduit extending to said switch, and means on the lower portion of said stand to guide and protect said conduit.

8. An electrical appliance comprising a heater and parts movable relatively thereto, said parts comprising a switch casing and switch parts for biasing said heater to a position relative to the switch casing in which position the heater is deenergized.

9. An electrical appliance comprising a heater and parts movable relatively thereto, said parts comprising a switch casing and associated parts including a resilient switch contact for biasing said heater to a position relative to the switch casing in which position the heater is deenergized.

10. An electrical appliance comprising a switch casing, a heater unit relatively movable with respect thereto and having a rigid contact terminal, means for controlling the heater circuit comprising a resilient contacting device to coact with said heater terminal for biasing the heater to move relatively to said switch casing.

11. An electrical appliance comprising a switch casing, a heater unit relatively movable with respect to said casing and having a rigid contact terminal, means for controlling the heater circuit comprising a resilient contacting device to coact with said heater terminal for biasing the heater to move relatively to said switch casing to a position wherein the heater is deenergized.

12. An electrical appliance comprising a switch casing, a heater unit relatively movable with respect to said casing, control means for the heater circuit and means to act jointly as a support for the appliance when applied to an article to be acted upon thereby and also as a support for such article.

13. An electrical appliance comprising a switch casing, a relatively movable heater unit, control means for the heater circuit and means to act jointly as a support for the appliance when applied to an article to be acted upon thereby and also as a support for such article, said means comprising a switch operating element rigidly secured to said switch casing.

In witness whereof, I have hereunto subscribed my name.

EDWIN N. LIGHTFOOT.